(12) United States Patent
Nagasawa et al.

(10) Patent No.: US 7,272,422 B2
(45) Date of Patent: Sep. 18, 2007

(54) PORTABLE ELECTRONIC DEVICE

(75) Inventors: Yo Nagasawa, Daito (JP); Michiaki Koizumi, Daito (JP)

(73) Assignees: Sanyo Electric Co., Ltd., Osaka (JP); Sanyo Telecommunications Co., Ltd., Osaka (JP)

( * ) Notice: Subject to any disclaimer, the term of this patent is extended or adjusted under 35 U.S.C. 154(b) by 663 days.

(21) Appl. No.: 10/802,783

(22) Filed: Mar. 18, 2004

(65) Prior Publication Data
US 2004/0192417 A1    Sep. 30, 2004

(30) Foreign Application Priority Data
Mar. 24, 2003    (JP)    ............... 2003-079887

(51) Int. Cl.
*H04R 1/02*    (2006.01)
*H04R 1/20*    (2006.01)
*H04M 1/00*    (2006.01)
*H04B 1/38*    (2006.01)

(52) U.S. Cl. .................................. 455/575.1
(58) Field of Classification Search ............. 455/575.1, 455/566
See application file for complete search history.

(56) References Cited

U.S. PATENT DOCUMENTS

2004/0192417 A1*    9/2004    Nagasawa et al. ....... 455/575.1

FOREIGN PATENT DOCUMENTS

| JP | 2001-309002 | 11/2001 |
| JP | 2002-58094 | 2/2002 |
| KR | 2002-0063023 | 8/2002 |

* cited by examiner

*Primary Examiner*—William D. Cumming
(74) *Attorney, Agent, or Firm*—Kratz, Quintos & Hanson, LLP

(57) ABSTRACT

A portable electronic device wherein a first case has a first sound radiating hole formed in the front wall thereof and positioned as opposed to a speaker and a second sound radiating hole formed in the rear wall thereof and positioned as opposed to the speaker. The two cases are rotatably joined by a hinge mechanism. The second case has a second knuckle constituting the hinge mechanism and is provided with a strip member for opening or closing the second sound radiating hole with the closing or opening movement of the second case. The strip member has a free end portion to be wound up by the second knuckle to open the second sound radiating hole when the two cases are in a closed state or to be paid out to close the second sound radiating hole when the two cases are in an opened state.

3 Claims, 7 Drawing Sheets

PORTABLE ELECTRONIC DEVICE

FIELD OF THE INVENTION

The present invention relates to portable electronic devices having a speaker, such as portable telephones.

BACKGROUND OF THE INVENTION

The portable telephones having a speaker and heretofore proposed include, for example, a foldable portable telephone as shown in FIG. 8 (see JP-A No. 2002-58094). This telephone comprises a first case 91 and a second case 92 which are connected by a hinge mechanism 93 and closable or openable relative to each other. The first case 91 has a plurality of manual keys 94 arranged on the surface thereof and a transmitter (not shown) thereon. The second case 92 has a display 95 on the surface thereof and a receiver hole 96 above the display 95. Positioned as opposed to the receiver hole 96 is a receiver 81 provided inside the second case 92 for receiving incoming calls. A speaker 82 for radiating incoming sound is attached to the rear side of the receiver 81 and opposed to the rear wall of the second case 92. Positioned as opposed to the speaker 82 is a sound radiating hole 97 formed in the rear wall of the second case 92.

Since the receiver 81 and the speaker 82 in the form of a unit can be accommodated in the second case 92, the foldable portable telephone described can be manufactured at a reduced cost by a simplified process.

However, the telephone shown in FIG. 8 has the problem that when the display 95 is exposed as opened and is opposed to the user, the speaker 82 faces toward a direction opposite to the user, radiating sound toward the opposite direction to the user.

This problem may be overcome by providing the sound radiating side of the speaker on the front wall of the second case, but when the foldable portable telephone is so constructed, the sound radiating side is covered with the other case in the closed state, hence the problem that in the closed state, the user is unable to enjoy the sound radiated from the speaker with a satisfactory quality in a sufficient volume.

FIGS. 9(a) and 9(b) show a foldable portable telephone which is free of the above problem. This telephone has a speaker 83 housed in a first case 91. Positioned as opposed to the speaker 83 is a sound radiating hole 98 formed in the front wall of the first case 91. A second case 92 has a through hole 99 at a position to be opposed to the sound radiating hole 98 when closed.

In the case of the above telephone, the sound from the speaker 83 is radiated through the hole 98 formed in the front wall of the first case 91 when the second case 92 is set in the opened state relative to the first case 91 as shown in FIG. 9(b). The user can therefore enjoy the sound radiated from the speaker 83 with a high quality in a large volume. When the second case 92 is set in the closed state relative to the first case 91 as shown in FIG. 9(a), the user is capable of enjoying the sound from the speaker 83 with a satisfactory quality in a sufficient volume in spite of the closed state since the sound from the speaker 83 is released via the through hole 99 in the second case 92 opposed to the sound radiating hole 98.

Since the large through hole 99 must be formed in the second case 92, the telephone shown in FIGS. 9(a) and 9(b) nevertheless has the problem that the second case 92 becomes large-sized, consequently making the telephone larger in its entirety.

SUMMARY OF THE INVENTION

An object of the present invention is to provide a portable electronic device which comprises two cases and which permits the sound output from a speaker to be maintained with a satisfactory quality in a sufficient volume regardless of whether the two cases are opened or closed without giving an enlarged size to the case.

The present invention provides a portable electronic device comprising a first case 10 housing a speaker 40 therein, and a second case 20 connected to the first case 10 by a joint mechanism and openable or closable relative thereto, the first case 10 having a front wall to be covered with the second case 20 when the two cases 10, 20 are in a closed state or to be exposed when the two cases 10, 20 are in an opened state.

The first case 10 has a first sound radiating hole 15 formed in the front wall and positioned as opposed to the speaker 40 and a second sound radiating hole 16 formed in a rear wall thereof and positioned as opposed to the speaker 40. The joint mechanism has a shutter attached thereto for opening or closing the second sound radiating hole 16 with the closing or opening movement of the second case 20. The shutter opens the second sound radiating hole 16 when the two cases 10, 20 are in the closed state and closes the second sound radiating hole 16 when the two cases 10, 20 are in the opened state.

When the two cases 10, 20 of the portable electronic device according to the present invention are set in the opened state, the first sound radiating hole 15 in the front wall of the first case 10 is opened, and the shutter is moved by the opening movement of the second case 20, closing the second sound radiating hole 16 in the rear wall of the first case 10 with the shutter. The sound output from the speaker 40 is therefore emitted only through the first sound radiating hole 15. Consequently, the user can enjoy the sound from the speaker 40 with a satisfactory quality in a sufficient volume.

When the two cases 10, 20 are set in the closed state, on the other hand, the first sound radiating hole 15 in the front wall of the first case 10 is closed with the second case 20, and the shutter is moved by the closing movement of the second case 20 from the position closing the second sound radiating hole 16 in the rear wall of the first case 10 to open this hole 16, whereby the sound output from the speaker 40 is emitted through the second sound radiating hole 16 only. As a result, the sound is maintained nearly with the same quality in the same volume as when the cases 10, 20 are opened. In this state, the sound output from the speaker 40 is radiated through the rear wall of the first case 10, so that there is no need to form a through hole or the like in the second case 20 for passing the sound therethrough. This obviates the likelihood that the second case 20 will become larger in size.

Stated specifically, the joint mechanism is a hinge mechanism 30, and the hinge mechanism 30 comprises a first knuckle 18 formed at an upper end of the first case 10 and a second knuckle 23 formed at a lower end of the second case 20, the first and second knuckles 18, 23 being joined by and supported on a pivot and rotatable relative to each other. The shutter comprising a strip member 43 attached at a base end portion thereof to the second knuckle 23, and the strip member 43 has a free end portion to be wound up by the rotation of the second knuckle 23 to open the second sound radiating hole 16 when the two cases 10, 20 are in the closed state or to be paid out by the rotation of the second knuckle 23 to close the second sound radiating hole 16 when the two cases 10, 20 are in the opened state.

When the two cases 10, 20 thus constructed are set in the opened state, the first sound radiating hole 15 in the front wall of the first case 10 is opened, and the strip member 43 is paid out from the second knuckle 23 by the opening movement of the second case 20, closing the second sound radiating hole 16 in the rear wall of the first case 10 with the free end portion of the strip member 43, whereby the sound output from the speaker 40 is emitted only through the first sound radiating hole 15. This enables the user to enjoy the sound from the speaker 40 with a satisfactory quality in a sufficient volume.

In the case where the two cases 10, 20 are set in the closed state, the first sound radiating hole 15 in the front wall of the first case 10 is closed with the second case 20, and the strip member 43 is wound up around the second knuckle 23 by the closing movement of the second case 20, opening the second sound radiating hole 16 in the rear wall of the first case 10 by removing the closing free end portion of the strip member 43. This permits the sound from the speaker 40 to be emitted from the second sound radiating hole 16 only. Consequently, the sound is maintained nearly with the same quality in the same volume as when the cases 10, 20 are in the opened state.

Further stated specifically, the speaker 40 is held by a speaker holder 42 and is provided with a guide 45 for guiding winding up or paying out of the free end portion of the strip member 43. Since the strip member 43 is thus guided by the guide 45 of the speaker holder 42 for winding up or paying out, the strip member 43 can be wound up or paid out while being positioned in place without displacement.

With the portable electronic device of the present invention described above, the sound output from the speaker can be maintained with a satisfactory quality in sufficient volume without the likelihood of making the case greater in size.

DETAILED DESCRIPTION OF EMBODIMENT

Figure 1:
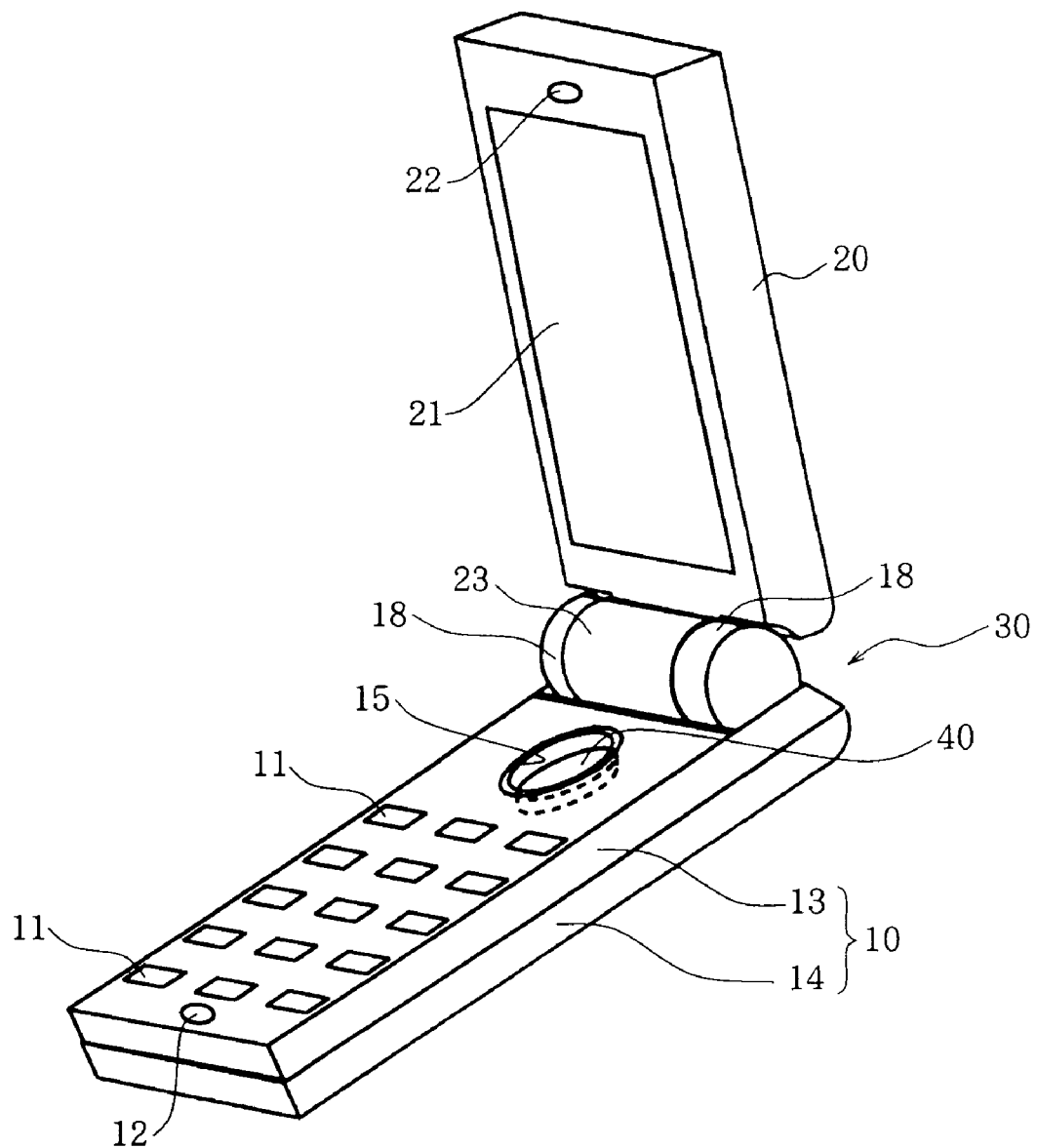
FIG. 1 is a perspective view of a foldable portable telephone according to the invention in an opened state.

The present invention as embodied into a foldable portable telephone will be described below in detail with reference to the drawings concerned. The foldable portable telephone according to the invention comprises a first case 10 and a second case 20 which are rotatably connected together by a hinge mechanism 30 as shown in FIG. 1. The first case 10 comprises a front segment 13 and a rear segment 14 which are joined together. The front segment 13 has a plurality of manual keys 11 arranged on the front wall thereof, and a transmitter 12 below the keys. The front segment 13 further has a first sound radiating hole 15 provided above the keys 11 for the speaker 40 to be described below. On the other hand, the second case 20 has a display 21 on the front wall thereof and a receiver 22 above the display 21.

Figure 2:
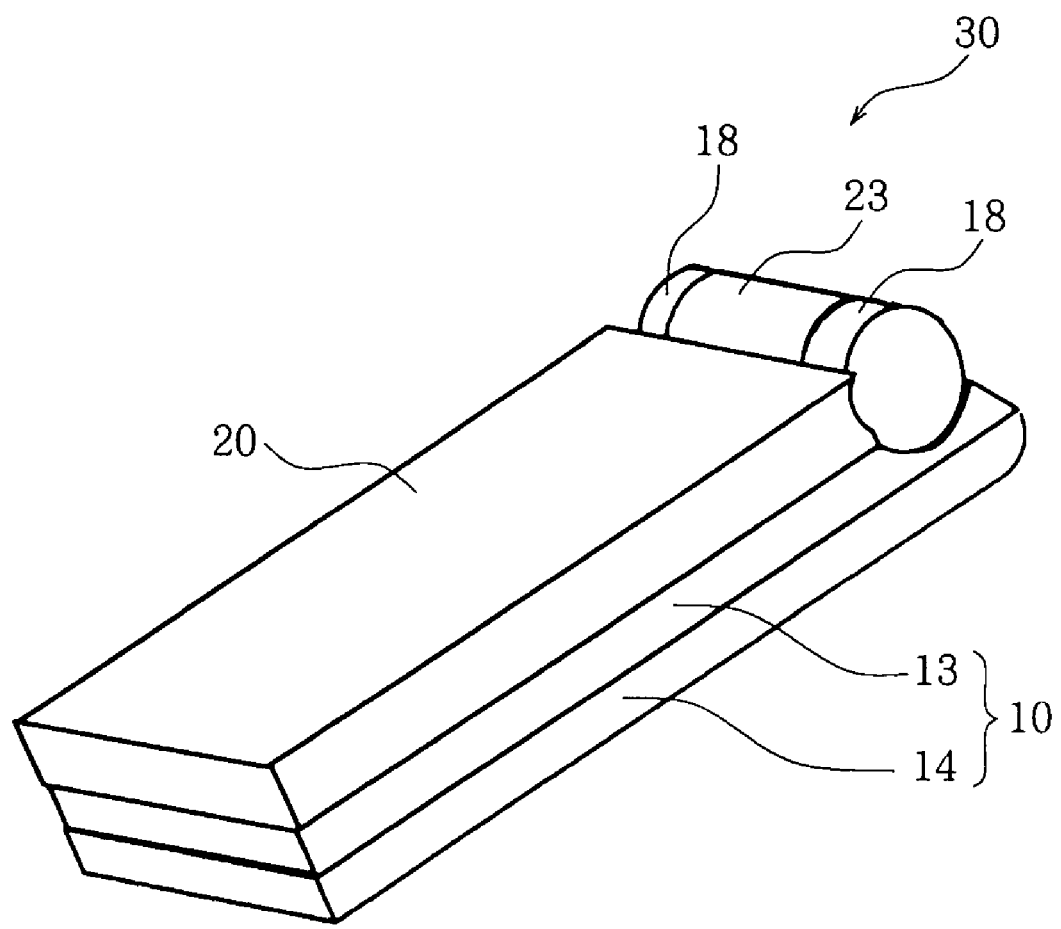
FIG. 2 is a perspective view of the telephone as closed.

The hinge mechanism 30 comprises first knuckles 18 provided at the upper end of the first case 10, and a second knuckle 23 formed at the lower end of the second case 20 and rotatable relative to the knuckles 18, the knuckles 18, 23 being joined by a pivot, whereby the second case 20 is pivotally movable relative to the first case 10 between an opened state wherein the two cases 10, 20 have their front walls exposed as shown in FIG. 1, and a closed state wherein the two cases 10, 20 have their front walls opposed to each other as shown in FIG. 2.

Figure 3:
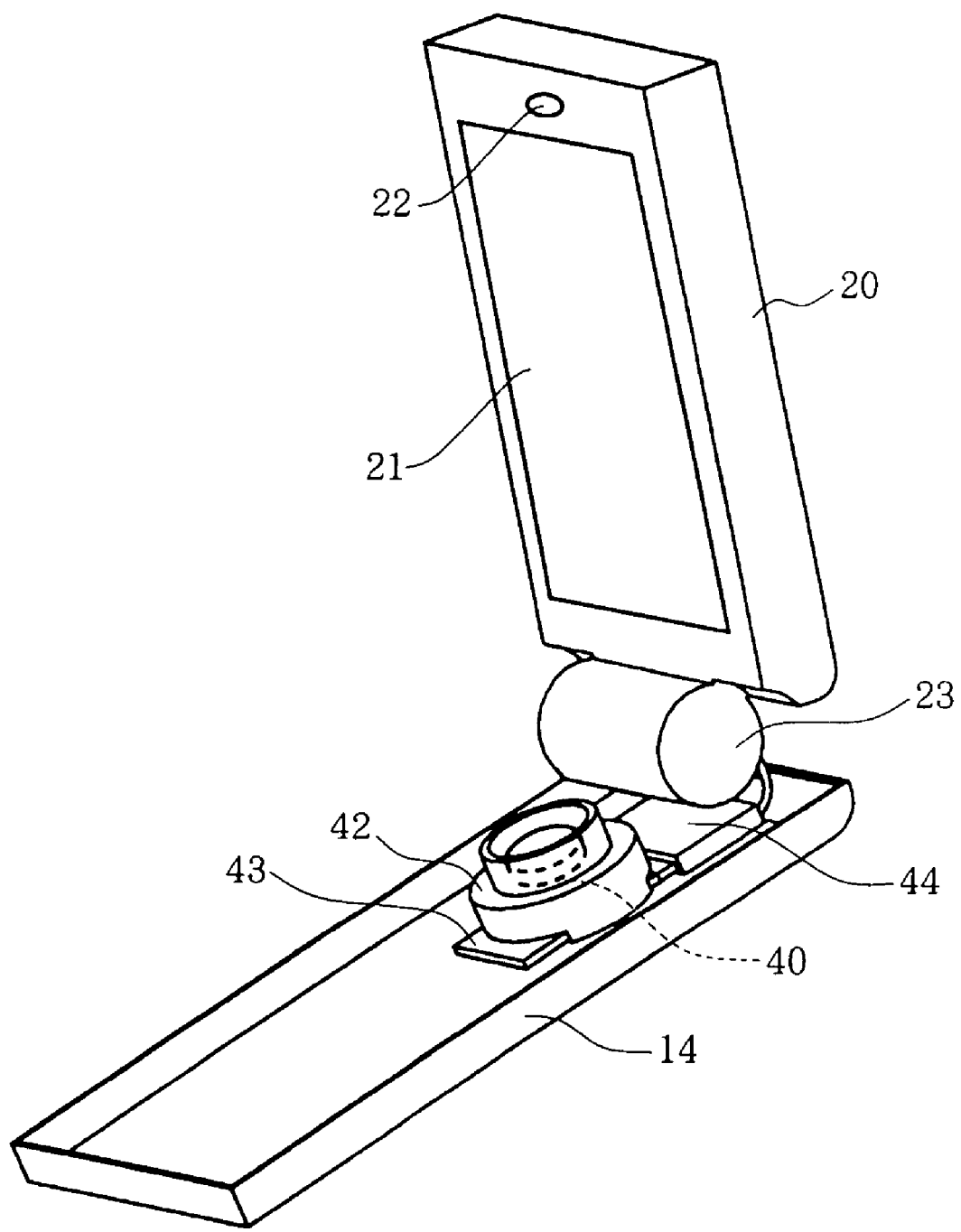
FIG. 3 is a perspective view showing a speaker accommodated in a first case of the telephone.
Figure 5:
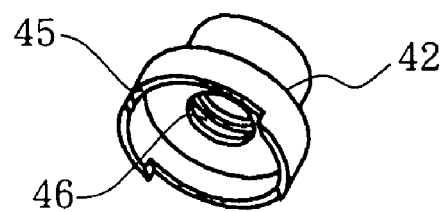
FIG. 5 is a perspective view of a speaker holder.
Figure 6:
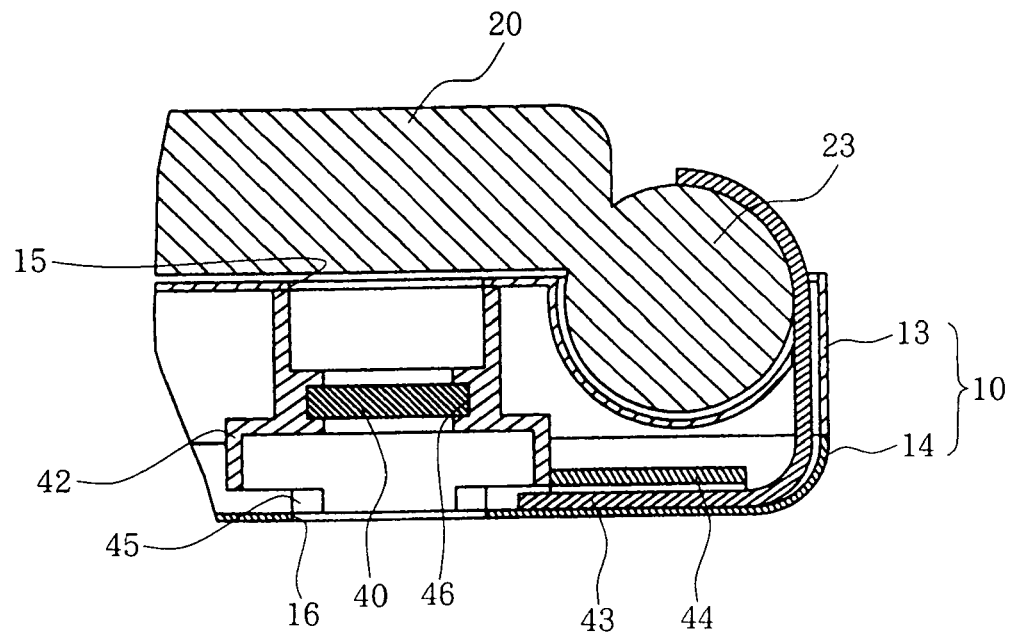
FIG. 6 is a fragmentary sectional view of the telephone as closed.

With reference to FIG. 3, a speaker 40 is accommodated as supported by a speaker holder 42 in the first case 10. The speaker 40 is adapted to radiate sound forward and also rearward at the same time. As shown in FIGS. 5 and 6, the speaker holder 42 is so shaped that two hollow cylindrical members which are different in diameter have their bottom faces joined to each other, and has a speaker holding portion 46 in its center for holding the speaker 40 therein. The speaker holding portion 46 has top and bottom walls each with a through hole formed therein. Thus, the speaker 40 is adapted to radiate sound upward and downward through the walls.

Figure 4:
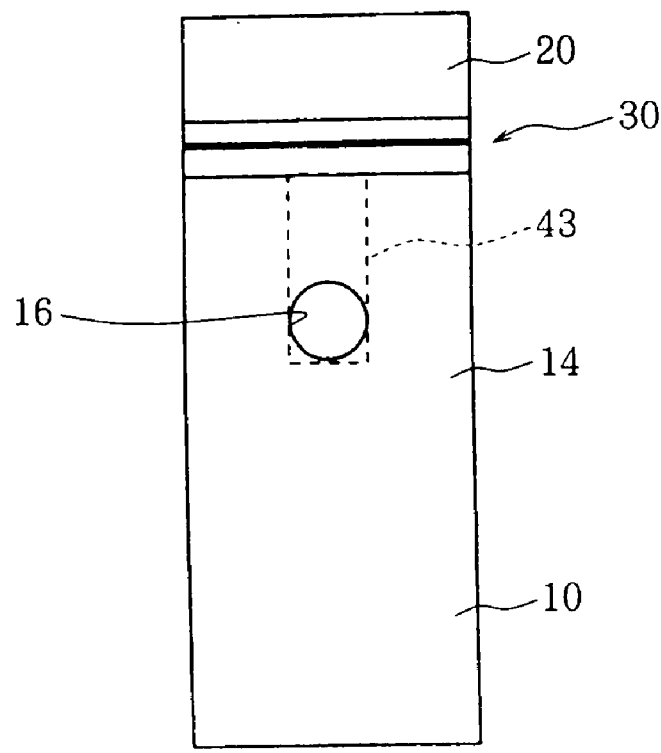
FIG. 4 is a rear view of the first case.

With reference to FIGS. 1 and 6, the first case 10 is provided in its front wall with the first sound radiating hole 15 positioned as opposed to the speaker 40 which is supported by the speaker holder 42 and placed in the first case 10. As shown in FIGS. 4 and 6, the first case 10 has a second sound radiating hole 16 formed in its rear wall and positioned as opposed to the speaker 40.

Figure 7:
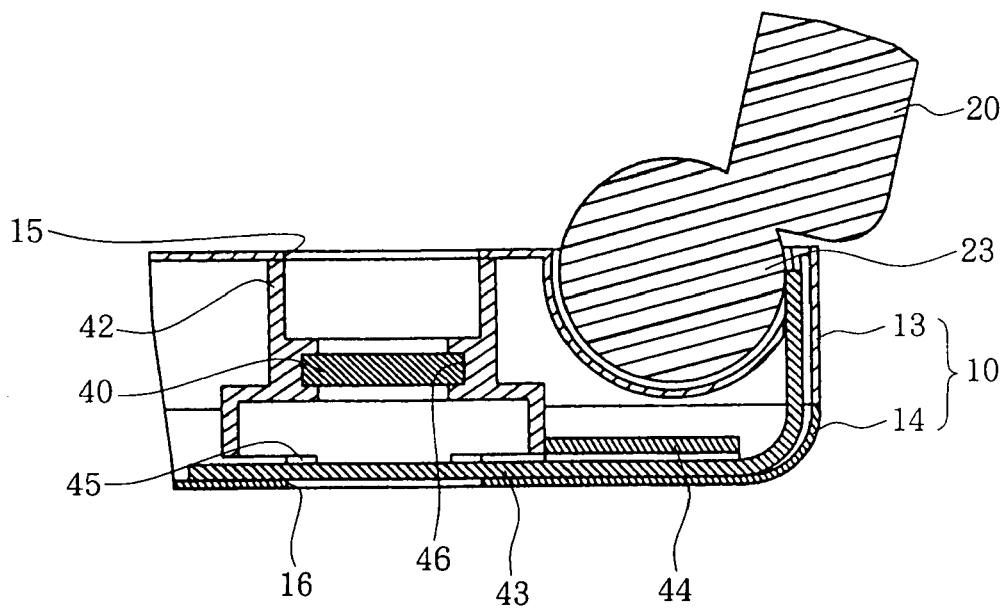
FIG. 7 is a fragmentary sectional view of the telephone as opened.
Figure 8:
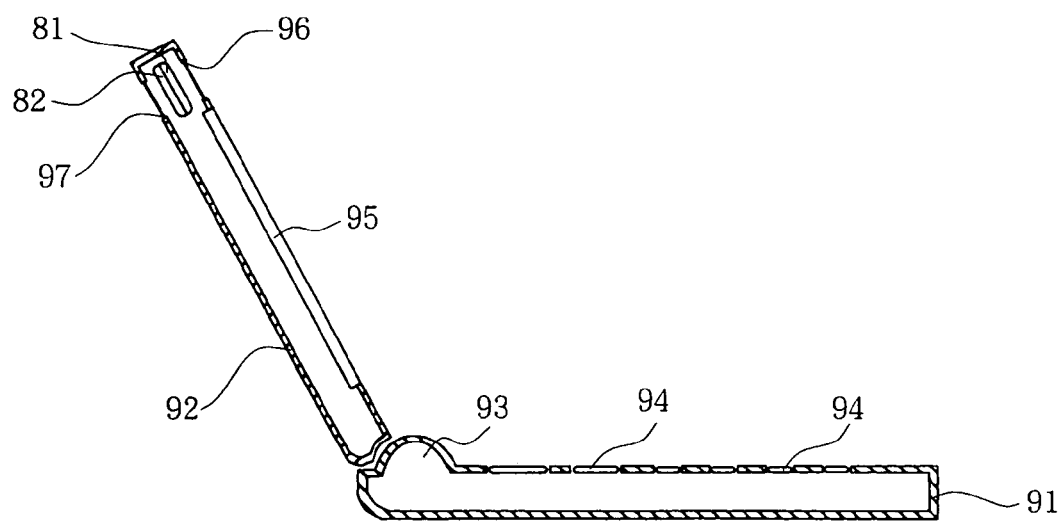
FIG. 8 is a sectional view of a conventional foldable portable telephone.
Figure 9:
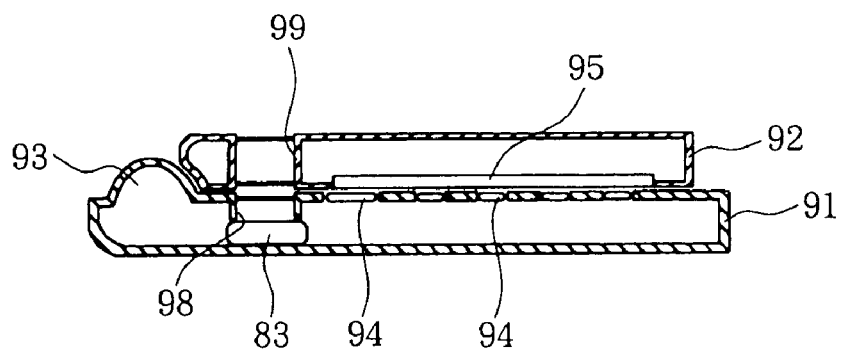
FIGS. 9(a) and 9(b) are sectional views of another conventional foldable portable telephone as closed and as opened, respectively.
Figure 9:
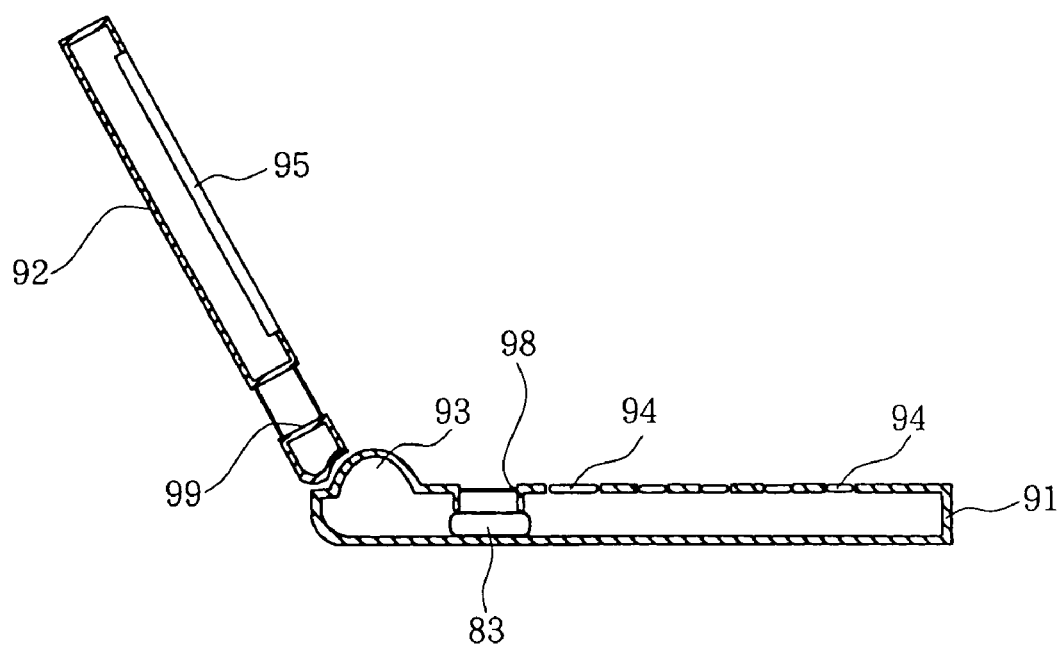

Further with reference to FIGS. 3 and 7, the second case 20 has a flat strip member 43 attached to the second knuckle 23 thereof and having an outer end extending in a direction perpendicular to the pivot of the hinge mechanism 30. The strip member 43 is disposed on the bottom wall of rear segment 14 of the first case 10 and has its upper surface and side faces covered with a guide 45 of the speaker holder 42 and a shutter guide 44, whereby the strip member 43 is made slidable on the bottom wall of rear segment 14 of the first case 10 with the pivotal movement of the second case 20 while being positioned in place against displacement. This permits the outer end of the strip member 43 to be wound around the second knuckle 23 to open the second sound radiating hole 16 when the two cases 10, 20 are set in their closed state as shown in FIG. 6, while the strip member 43 is paid out from the second knuckle 23 to close the hole 16 when the two cases 10, 20 are set in the opened state as shown in FIG. 7.

When the foldable portable telephone of the present invention has its cases 10, 20 set in the opened state as shown in FIG. 1, the first sound radiating hole 15 in the front wall of the first case 10 is opened, and the strip member 43 is paid out from the second knuckle 23 by the opening movement of the second case 20 to close the second sound radiating hole 16 in the rear wall of the first case 10 with the inner end portion of the strip member 43 as shown in FIG. 7. This permits the sound from the speaker 40 to be emitted through the first sound radiating hole 15, consequently enabling the user to enjoy the sound from the speaker 40 with a satisfactory quality in sufficient volume.

In the case where the two cases 10, 20 are closed as shown in FIG. 2, the first sound radiating hole 15 in the front wall of the first case 10 is closed with the second case 20, the strip member 43 is wound around the second knuckle 23 by the closing movement of the second case 20, and the second sound radiating hole 16 in the rear wall of the first case 10 is opened by removing the closing inner end portion of the strip member 43 as shown in FIG. 6. The sound output from the speaker 40 is therefore emitted through the second sound radiating hole 16. Consequently, the sound is maintained nearly with the same quality in the same volume as when the second case 20 is open.

With the foldable portable telephone of the present invention, the sound output from the speaker 40 is emitted through one of the sound radiating holes depending on whether the case 20 is opened or closed relative to the case 10, so that the sound can be maintained with a satisfactory quality in sufficient volume regardless of whether the cases 10, 20 are opened or closed. When the cases 10, 20 are set in the closed state, the sound output from the speaker 40 is radiated through the rear wall of the first case 10. The second case 20 therefore need not be provided with a through hole or the like for passing the sound therethrough. Accordingly, the second case 20 is unlikely to become larger in size.

The device of the present invention is not limited to the foregoing embodiment in construction but can be modified variously by one skilled in the art without departing from the spirit of the invention as set forth in the appended claims. The same advantage as above is available, for example, when the construction of the invention is used for a portable telephone of the slide type wherein two cases are fitted over, and slidably engaged with, each other. The same advantage as above is available also when the shutter mechanism for opening or closing the second sound radiating hole 16 with the pivotal movement of the second case 20 is operatively connected to the hinge mechanism 30.

A through hole which remains unclosed by the speaker 40 can be additionally formed in the speaker holder as a speaker holder of other construction. When the two cases 10, 20 are opened in the case where the portable telephone has this speaker holder, the sound emitted by the speaker 40 partly resonates in the space provided by the second sound radiating hole 16 and the strip member 43, and the resulting sound is released through the above through hole and via the first sound radiating hole 15. This modification therefore has the same advantage as the above embodiment, and the speaker 40 is capable of reproducing a sound of great volume even if having a small output. This serves to make the speaker 40 smaller than conventionally in the case where nearly the same volume of sound as conventionally is required.

What is claimed is:

1. A portable electronic device comprising a first case housing a speaker therein, and a second case connected to the first case by a joint mechanism and openable or closable relative thereto, the first case having a front wall to be covered with the second case when the two cases are in a closed state or to be exposed when the two cases are in an opened state, the first case having a first sound radiating hole formed in the front wall and positioned as opposed to the speaker and a second sound radiating hole formed in a rear wall thereof and positioned as opposed to the speaker, the joint mechanism having a shutter attached thereto for opening or closing the second sound radiating hole with the closing or opening movement of the second case, the shutter being operable to open the second sound radiating hole when the two cases are in the closed state and to close the second sound radiating hole when the two cases are in the opened state.

2. A portable electronic device according to claim 1 wherein the joint mechanism is a hinge mechanism, and the hinge mechanism comprises a first knuckle formed at an upper end of the first case and a second knuckle formed at a lower end of the second case, the first and second knuckles being joined by and supported on a pivot and rotatable relative to each other, the shutter comprising a strip member attached at a base end portion thereof to the second knuckle, the strip member having a free end portion to be wound up by the rotation of the second knuckle to open the second sound radiating hole when the two cases are in the closed state or to be paid off by the rotation of the second knuckle to close the second sound radiating hole when the two cases are in the opened state.

3. A portable electronic device according to claim 2 wherein the speaker is held by a speaker holder and is provided with a guide for guiding winding up or paying out of the free end portion of the strip member.

* * * * *